United States Patent
Shin et al.

(10) Patent No.: US 10,040,333 B2
(45) Date of Patent: Aug. 7, 2018

(54) AIR CONDITIONING APPARATUS FOR VEHICLE

(71) Applicant: Hyundai Motor Company, Seoul (KR)

(72) Inventors: Gee Young Shin, Suwon-si (KR); June Kyu Park, Hwaseong-si (KR); Keon Soo Jin, Ulsan (KR); Dong Ho Kwon, Bonghwa-eup (KR); Dae Ig Jung, Suwon-si (KR); Kwang Woon Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/352,810

(22) Filed: Nov. 16, 2016

(65) Prior Publication Data

US 2018/0009287 A1 Jan. 11, 2018

(30) Foreign Application Priority Data

Jul. 6, 2016 (KR) .................. 10-2016-0085664

(51) Int. Cl.
*B60H 1/00* (2006.01)

(52) U.S. Cl.
CPC ....... *B60H 1/00035* (2013.01); *B60H 1/0005* (2013.01); *B60H 1/00842* (2013.01); *B60H 1/00899* (2013.01); *B60H 2001/00135* (2013.01); *B60H 2001/00178* (2013.01)

(58) Field of Classification Search
CPC ............ B60H 1/00035; B60H 1/00842; B60H 1/0005; B60H 2001/00135
See application file for complete search history.

(56) References Cited

U.S. PATENT DOCUMENTS

| | | | | |
|---|---|---|---|---|
| 2005/0263277 | A1* | 12/2005 | Kim .................. | B60H 1/00071 165/203 |
| 2011/0120146 | A1* | 5/2011 | Ota .................. | B60H 1/00885 62/3.3 |
| 2013/0333406 | A1* | 12/2013 | Takahashi .......... | B60H 1/00921 62/238.7 |

(Continued)

FOREIGN PATENT DOCUMENTS

| | | |
|---|---|---|
| JP | 2014-61877 A | 4/2014 |
| JP | 2015-155306 | 8/2015 |

(Continued)

*Primary Examiner* — Kun Kai Ma
(74) *Attorney, Agent, or Firm* — Morgan, Lewis & Bockius LLP (57) ABSTRACT

An air conditioning apparatus for a vehicle may include a cooling duct provided with a cooling duct inlet at a first end of the cooling duct, and a cooling duct indoor outlet and a cooling duct outdoor outlet at a second end cooling duct, and including an evaporation core disposed in the cooling duct, a heating duct provided with a heating duct inlet at a first end of the heating duct, and a heating duct indoor outlet and a heating duct outdoor outlet at a second end of the heating duct, and including a condenser disposed in the heating duct, and an overlapping duct provided by overlapping the cooling duct with the heating duct, the evaporation core and the condenser being disposed respectively at an upstream and a downstream of an air flow, and the evaporation core and the condenser may be connected with each other on one refrigerant passage.

9 Claims, 9 Drawing Sheets

(56) References Cited

U.S. PATENT DOCUMENTS

| | | | | |
|---|---|---|---|---|
| 2014/0075973 A1* | 3/2014 | Graaf | ................ | B60H 1/00328 |
| | | | | 62/115 |
| 2014/0075975 A1* | 3/2014 | Graaf | ................ | B60H 1/00007 |
| | | | | 62/119 |
| 2015/0082820 A1* | 3/2015 | Takahashi | ............ | B60H 1/0005 |
| | | | | 62/238.7 |
| 2015/0360537 A1* | 12/2015 | Park | ................... | B60H 1/00742 |
| | | | | 165/203 |
| 2017/0217278 A1* | 8/2017 | Richter | ............. | B60H 1/00064 |

FOREIGN PATENT DOCUMENTS

| | | |
|---|---|---|
| KR | 10-2007-0064937 A | 6/2007 |
| KR | 10-2015-0039545 | 4/2015 |

\* cited by examiner

AIR CONDITIONING APPARATUS FOR VEHICLE

CROSS REFERENCE TO RELATED APPLICATION

The present application claims priority to Korean Patent Application No 10-2016-0085664, filed Jul. 6, 2016, the entire contents of which is incorporated herein for all purposes by this reference.

BACKGROUND OF THE INVENTION

Field of the Invention

The present invention relates generally to a structure of an air conditioning apparatus for a vehicle and, more particularly, to a structure of an air conditioning apparatus for a vehicle whereby the apparatus allows for effective air conditioning under a predetermined operating condition.

Description of Related Art

Generally, a vehicle is provided with an air conditioning apparatus for cooling and heating a passenger compartment. The air conditioning apparatus aims to maintain the passenger compartment at a pleasant temperature.

A cooler of the air conditioning apparatus for a vehicle includes a compressor compressing a refrigerant, a condenser condensing the compressed refrigerant in the compressor, an expansion valve changing the liquefied refrigerant that is condensed by the condenser into a low-temperature and low-pressure refrigerant, and an evaporator cooling air by using latent heat of vaporization of the refrigerant. The cooling system generally lowers the temperature of air and controls absolute humidity.

Heating is performed by using heat from an engine coolant, which is at a high temperature by taking heat from the engine, as a heat source. A heater includes a heater core, and a pump allowing the engine coolant to circulate. The heating system generally raises the temperature of air and controls relative humidity.

In the case of a conventional air conditioning apparatus, cool air is supplied through the cooler, and warm air is supplied through the coolant of an engine, but it may be required to change a structure of the apparatus depending on operating conditions. In particular, in the case of non-engine coolant, it is difficult to configure the conventional air conditioning apparatus, and also the conventional air conditioning apparatus may be inefficient.

Further, in order to remove moisture, which obstructs the view of a driver by being condensed on the windows of the vehicle, it is required to quickly supply dry air that is conditioned in terms of both absolute humidity and relative humidity, and accordingly a system for quickly supplying the dry air is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a new heat source of an air conditioning apparatus for supplying warmth, and intended to provide an air conditioning apparatus that is optimized to the heat source, thereby improving operation efficiency of the air conditioning apparatus.

Various aspects of the present invention are additionally directed to providing a way of quickly supplying dry air that is conditioned in terms of both absolute humidity and relative humidity under the situation where the moisture condensed on the window of a vehicle should be quickly removed.

According to various aspects of the present invention, an air conditioning apparatus for a vehicle may include a cooling duct provided with a cooling duct inlet at a first end of the cooling duct, and a cooling duct indoor outlet and a cooling duct outdoor outlet at a second end cooling duct, and including an evaporation core disposed in the cooling duct, a heating duct provided with a heating duct inlet at a first end of the heating duct, and a heating duct indoor outlet and a heating duct outdoor outlet at a second end of the heating duct, and including a condenser disposed in the heating duct, and an overlapping duct provided by overlapping the cooling duct with the heating duct, in which the evaporation core and the condenser are disposed respectively at an upstream and a downstream of an air flow, and the evaporation core and the condenser are connected with each other on one refrigerant passage.

The air conditioning apparatus may further include a cooling duct exhaust control door provided between the indoor outlet and the outdoor outlet of the cooling duct, and controlling an outflow amount of air, and a heating duct exhaust control door provided between the indoor outlet and the outdoor outlet of the heating duct, and controlling an outflow amount of air.

The air conditioning apparatus may further include a first overlapping door provided on a partition wall between the cooling duct and the overlapping duct, and disposed between the evaporation core and the condenser such that the overlapping duct communicates with the cooling duct.

The air conditioning apparatus may further include a second overlapping door provided on a partition wall between the heating duct and the overlapping duct, and disposed between the evaporation core and the condenser such that the overlapping duct communicates with the heating duct.

When the first overlapping door and the second overlapping door are opened simultaneously, the first overlapping door may be overlapped with the second overlapping door.

The air conditioning apparatus may further include a controller controlling opening and closing of a cooling duct exhaust control door, a heating duct exhaust control door, and the first overlapping door, in which in a reheating mode, the controller may control the first overlapping door to be closed, control the heating duct exhaust control door to close the heating duct indoor outlet, and control the cooling duct exhaust control door to close the cooling duct indoor outlet.

The air conditioning apparatus may further include a controller controlling opening and closing of a cooling duct exhaust control door, a heating duct exhaust control door, and the first overlapping door, in which in a maximum cooling mode, the controller may control the first overlapping door to be opened, control the heating duct exhaust control door to close the heating duct indoor outlet, and control the cooling duct exhaust control door to close the cooling duct outdoor outlet.

The air conditioning apparatus may further include a controller controlling opening and closing of a cooling duct exhaust control door, a heating duct exhaust control door, and the first overlapping door, in which in a maximum heating mode, the controller controls the first overlapping door to be opened, controls the heating duct exhaust control door to close the heating duct outdoor outlet, and controls the cooling duct exhaust control door to close the cooling duct indoor outlet.

The air conditioning apparatus may further include a controller controlling opening and closing of a cooling duct exhaust control door, a heating duct exhaust control door, the first overlapping door, and the second overlapping door, in which in a reheating mode, the controller may control the first overlapping door to be closed, control the second overlapping door to be closed, control the heating duct exhaust control door to close the heating duct indoor outlet, and control the cooling duct exhaust control door to close the cooling duct indoor outlet.

The air conditioning apparatus may further include a controller controlling opening and closing of a cooling duct exhaust control door, a heating duct exhaust control door, the first overlapping door, and the second overlapping door, in which in a maximum cooling mode, the controller may control the first overlapping door to be opened, control the second overlapping door to be closed, control the heating duct exhaust control door to close the heating duct indoor outlet, and control the cooling duct exhaust control door to close the cooling duct outdoor outlet.

The air conditioning apparatus of may further include a controller controlling opening and closing of a cooling duct exhaust control door, a heating duct exhaust control door, the first overlapping door, and the second overlapping door, in which in a maximum heating mode, the may controller control the first overlapping door to be opened, control the second overlapping door to be opened, control the heating duct exhaust control door to close the heating duct outdoor outlet, and control the cooling duct exhaust control door to close the cooling duct indoor outlet.

The air conditioning apparatus may further include a controller controlling opening and closing of the first overlapping door and the second overlapping door, in which in a temperature control mode, the controller may control the first overlapping door to be opened, and control the second overlapping door to be opened.

According to the air conditioning apparatus for a vehicle of various embodiments of the present invention, in the case of non-engine coolant, it is possible to configure an air conditioning apparatus for a vehicle having high energy efficiency, and the air conditioning apparatus is capable of supplying dry air that is conditioned in terms of both absolute humidity and relative humidity so as to quickly remove moisture.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
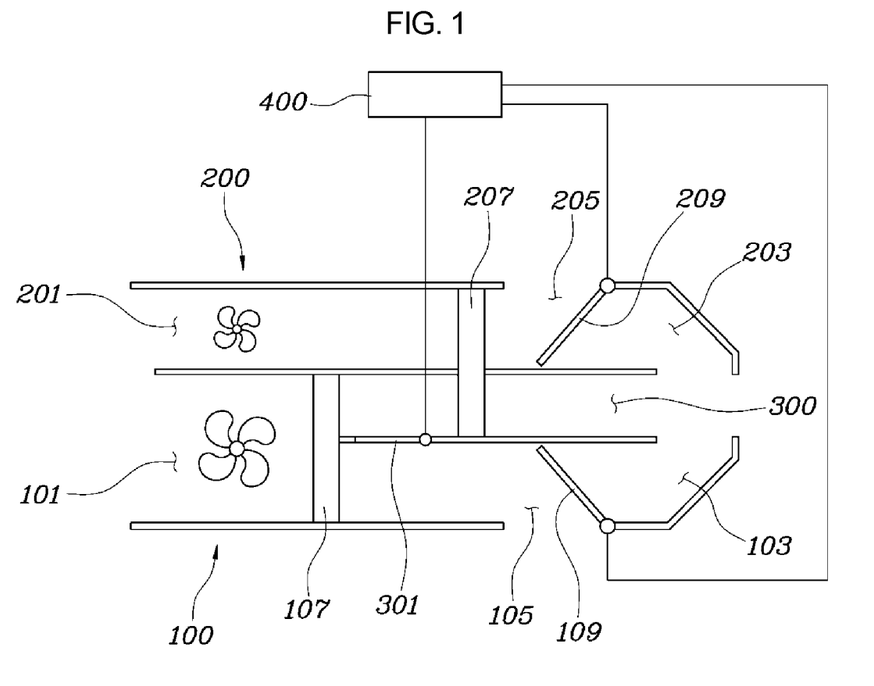
FIG. 1 is a view illustrating a configuration of an air conditioning apparatus for a vehicle according to various embodiments of the present invention.
Figure 2:
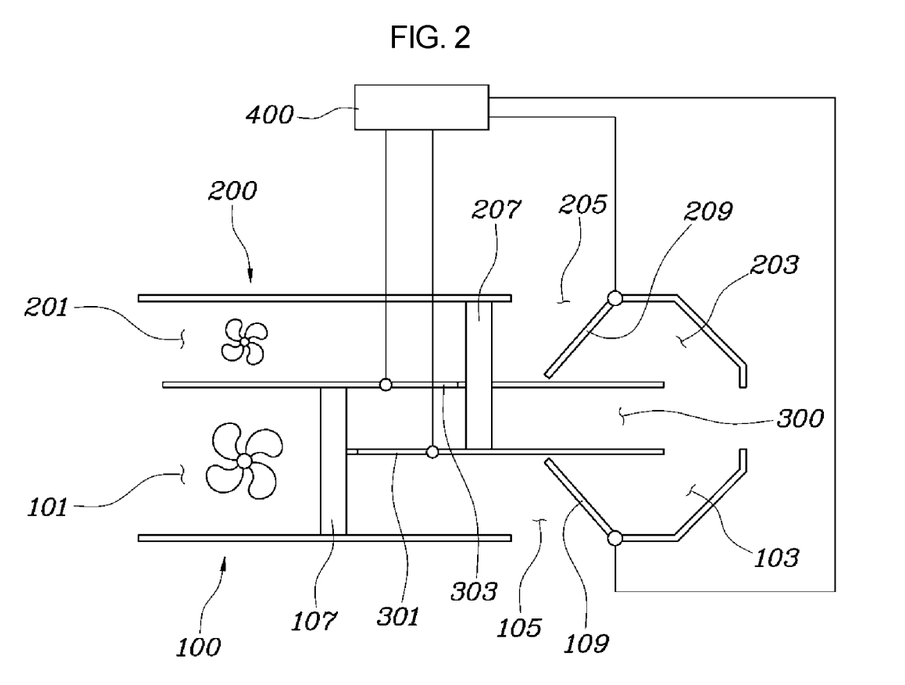
FIG. 2 is a view illustrating a configuration of an air conditioning apparatus for a vehicle according to various embodiments of the present invention.

FIG. 1 is a view illustrating a configuration of an air conditioning apparatus for a vehicle according to various embodiments of the present invention, and FIG. 2 is a view illustrating a configuration of an air conditioning apparatus for a vehicle according to various embodiments of the present invention.

Figure 3:
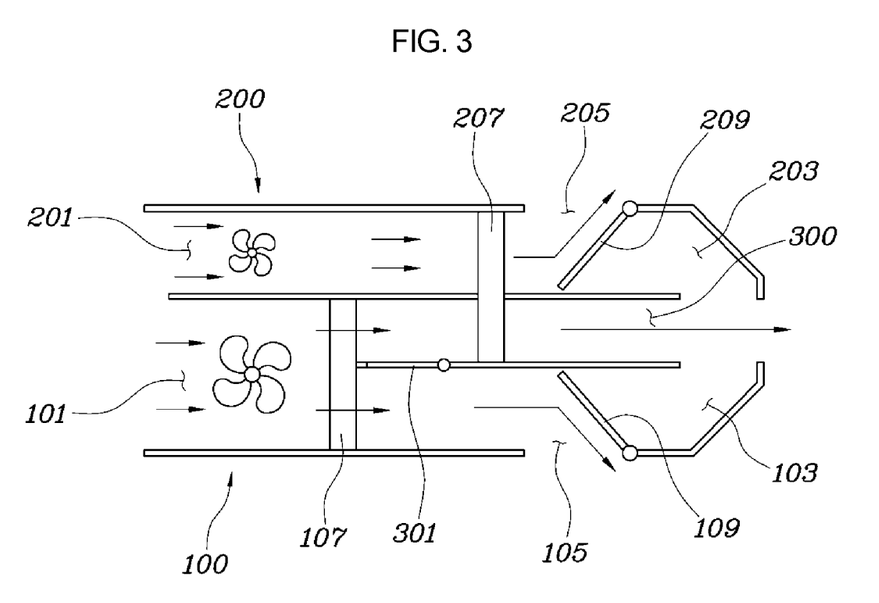
FIG. 3 is an operational view of the air conditioning apparatus for a vehicle according to various embodiments of the present invention in a reheating mode.
Figure 4:
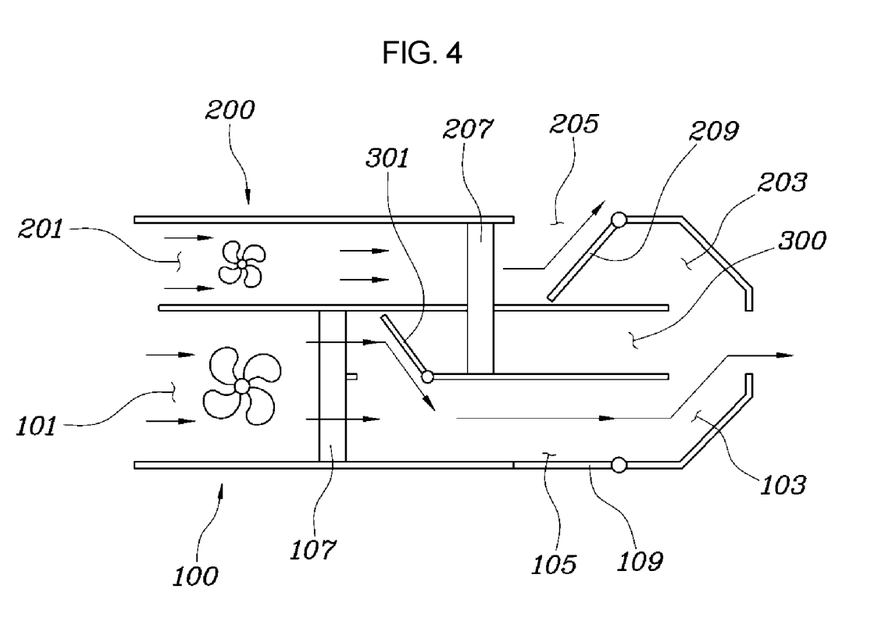
FIG. 4 is an operational view of the air conditioning apparatus for a vehicle according to various embodiments of the present invention in a maximum cooling mode.
Figure 5:
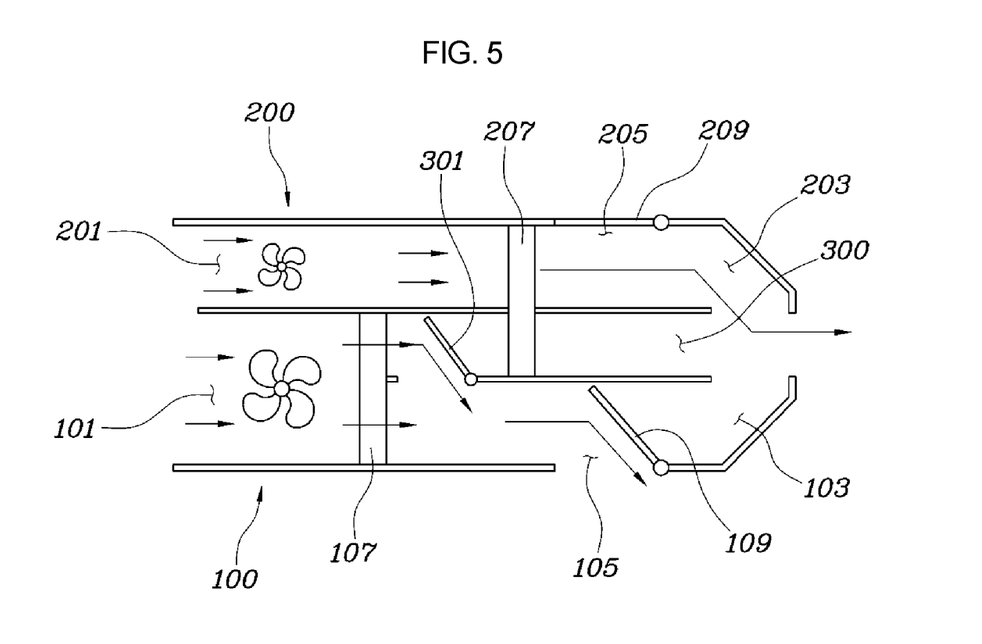
FIG. 5 is an operational view of the air conditioning apparatus for a vehicle according to various embodiments of the present invention in a maximum heating mode.

FIGS. 3 to 5 are operational views of the air conditioning apparatus for a vehicle according to various embodiments of the present invention in a reheating mode, in a maximum cooling mode, and in a maximum heating mode, and FIGS. 6 to 9 are operational views of the air conditioning apparatus for a vehicle according to various embodiments of the present invention in a reheating mode, in a maximum cooling mode, and in a maximum heating mode.

An air conditioning apparatus for a vehicle according to various embodiments of the present invention, includes a cooling duct 100 provided with a cooling duct inlet 101 at a first end thereof, and a cooling duct indoor outlet 103 and a cooling duct outdoor outlet 105 at a second end thereof, and an evaporation core 107 disposed therein, a heating duct 200 provided with a heating duct inlet 201 at a first end thereof, and a heating duct indoor outlet 203 and a heating duct outdoor outlet 205 at a second end thereof, and a condenser 207 disposed therein, and an overlapping duct 300 provided by overlapping the cooling duct 100 with the heating duct 200, wherein the evaporation core 107 and the condenser 207 are placed respectively at an upstream and a downstream of an air flow, wherein the evaporation core 107 and the condenser 207 are connected with each other on one refrigerant passage.

In various embodiments, the air conditioning apparatus may further include a cooling duct exhaust control door 109 provided between the indoor outlet and the outdoor outlet of the cooling duct 100, and controlling an outflow amount of air, and a heating duct exhaust control door 209 provided between the indoor outlet and the outdoor outlet of the heating duct 200, and controlling an outflow amount of air.

Referring to FIG. 1, the cooling duct 100 is provided with the cooling duct inlet 101 at the first end thereof, and provided with the cooling duct indoor outlet 103 and the cooling duct outdoor outlet 105 at the second end thereof, and the evaporation core 107 is disposed in the cooling duct 100. The heating duct 200 is provided with the heating duct inlet 201 at the first end thereof, and the heating duct indoor outlet 203 and the heating duct outdoor outlet 205 at the second end thereof, and the condenser 207 is disposed in the heating duct 200.

As described above, the cooling duct 100 and the heating duct 200 are separately provided in the form of separated spaces so as to reduce interference between conditioned airs thereof, and thereby it is possible to improve efficiency of the air conditioning apparatus by preventing cooled air from being reheated or by preventing heated air from being recooled. Further, the cooling duct 100 or the heating duct 200 is configured such that an outlet thereof is divided into an indoor outlet and an outdoor outlet, and the cooling duct exhaust control door 109 and the heating duct exhaust control door 209 are provided to control the indoor outlet and the outdoor outlet, whereby it is possible not only to supply conditioned air to a passenger compartment but also to discharge conditioned air to the outside when necessary.

Further, various embodiments of the present invention are provided with the overlapping duct 300 formed by overlapping a portion of the cooling duct 100 with a portion of the heating duct 200. The overlapping duct 300 may be in the form that the cooling duct 100 and the heating duct 200 share the spaces thereof with each other; and the evaporation core 107 and the condenser 207 disposed in the overlapping duct 300 may be configured to share portions thereof with the evaporation core 107 and the condenser 207 disposed in the cooling duct 100 and the heating duct 200. Inside the overlapping duct 300, the evaporation core 107 and the condenser 207 are placed respectively at the upstream and the downstream of an air flow, and thereby the air flowing in the overlapping duct 300 is dried.

To be more specific, the inlet of the overlapping duct 300 shares the cooling duct inlet 101 with the cooling duct 100. The air flowing in the overlapping duct 300 has low absolute humidity by condensation of the moisture thereof while firstly passing through the evaporation core 107, then the air has low relative humidity by being heated while passing through the condenser 207, and thereby it is possible to supply dry air to a passenger compartment in a reheating mode of the air conditioning apparatus, which will be described hereinafter.

The air conditioning apparatus may further include a first overlapping door 301 provided on a partition wall between the cooling duct 100 and the overlapping duct 300, and disposed between the evaporation core 107 and the condenser 207 such that the overlapping duct 300 communicates with the cooling duct 100.

In operating the air conditioning apparatus of a vehicle, the dry air having passed through the overlapping duct 300 is not always required, even in a maximum cooling mode or in a maximum heating mode, cooling efficiency of the air conditioning apparatus may be lowered because an area of the evaporation core 107 disposed in the overlapping duct 300 cannot be used.

Accordingly, in various embodiments of the present invention, as shown in FIG. 1, the first overlapping door 301 is disposed on the partition wall between the cooling duct 100 and the overlapping duct 300 and between the evaporation core 107 and the condenser 207. Thereby, when the first overlapping door 301 is opened, the air having flowed in the overlapping duct 300 and having passed through the evaporation core 107 is discharged to the cooling duct 100. Thus, even when the air conditioning apparatus is operated in a cooling mode, the cooling efficiency of the air conditioning apparatus may not be lowered because the entire area of the evaporation core 107 can be used.

In various embodiments, the air conditioning apparatus may further include a second overlapping door 303 provided on a partition wall between the heating duct 200 and the overlapping duct 300, and disposed between the evaporation core 107 and the condenser 207 such that the overlapping duct 300 communicates with the heating duct 200.

In various embodiments of the present invention, as shown in FIG. 2, the second overlapping door 303 is disposed on the partition wall between the heating duct 200 and the overlapping duct 300 and between the evaporation core 107 and the condenser 207. Thereby, when the second overlapping door 303 is opened, the air having flowed in the heating duct 200 is discharged to the overlapping duct 300. Thus, even when the air conditioning apparatus is operated in a heating mode, heating efficiency of the air conditioning apparatus may not be lowered because the entire area of the condenser 207 can be used.

When the first overlapping door 301 and the second overlapping door 303 are opened simultaneously, the first overlapping door 301 may be overlapped with the second overlapping door 303.

When the air conditioning apparatus is operated in a temperature control mode, rather than in a maximum cooling mode or in a maximum heating mode, cool air and warm air respectively supplied from the cooling duct 100 and the heating duct 200 are mixed to be used.

Figure 8:
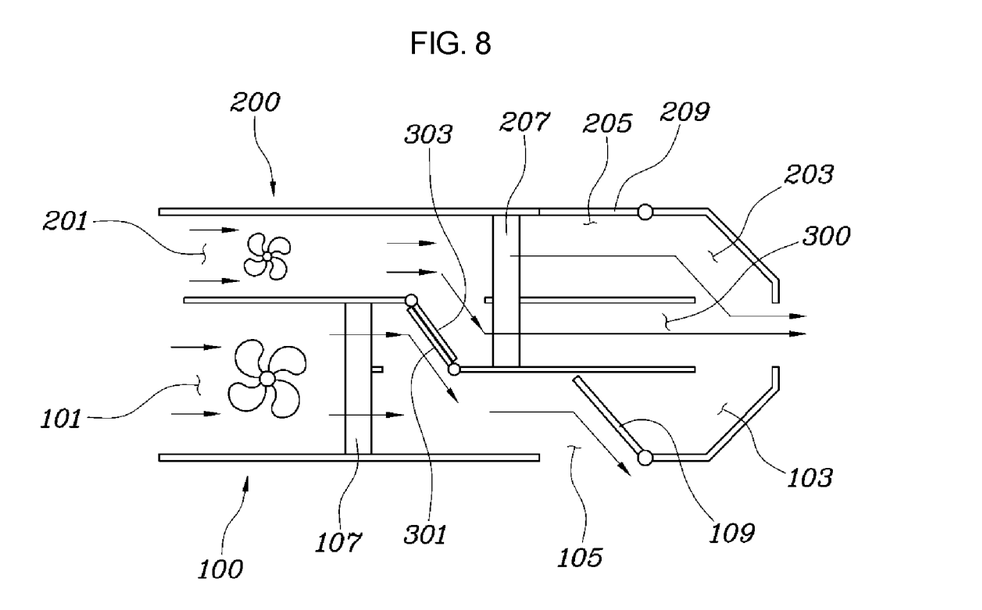
FIG. 8 is an operational view of the air conditioning apparatus for a vehicle according to various embodiments of the present invention in a maximum heating mode.
Figure 9:
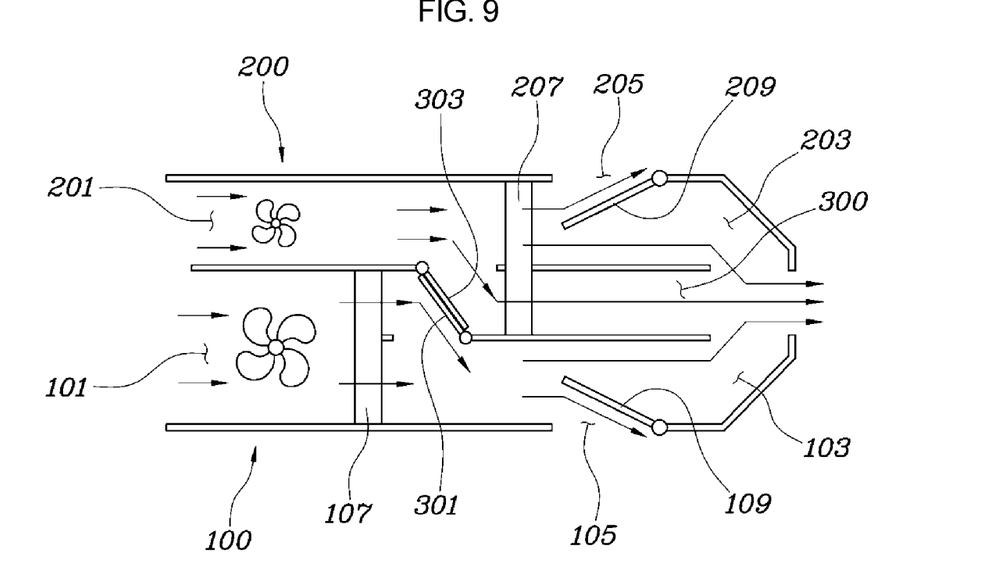
FIG. 9 is an operational view of an air conditioning apparatus for a vehicle according to various embodiments of the present invention in a temperature control mode.

Here, in various embodiments of the present invention, the entire area of both the evaporation core 107 and the condenser 207 in the air conditioning apparatus may be used by opening both the first overlapping door 301 and the second overlapping door 303. Further, as shown in FIGS. 8 to 9, the first overlapping door 301 and the second overlapping door 303 serve to close the overlapping duct 300 by being overlapped with each other, whereby it is possible to prevent the air having passed through the evaporation core 107 from being reheated by the condenser 207, and thus it is possible to prevent waste of energy, and possible to reduce an error in controlling temperature since air is mixed not at the indoor outlet of the air conditioning apparatus, but at other locations in advance.

In various embodiments, the air conditioning apparatus may further include a controller 400 controlling opening and closing of a cooling duct exhaust control door 109, a heating duct exhaust control door 209, and the first overlapping door 301, wherein in a reheating mode, the controller 400 controls the first overlapping door 301 to be closed, controls the heating duct exhaust control door 209 to close the heating duct indoor outlet 203, and controls the cooling duct exhaust control door 109 to close the cooling duct indoor outlet 103.

The reheating mode is a mode for primarily removing moisture of a passenger compartment by supplying only the air having passed through the overlapping duct 300 to the passenger compartment, and refers to the DEF mode that supplies air only to the window or refers to the MIX mode that supplies air to both the window and the floor.

When moisture is condensed on the window of a vehicle, it is important to secure a view of a driver, and accordingly it is required to supply dry air in order to quickly remove the moisture, and the moisture may be effectively removed in the DEF mode or in the MIX mode.

Thus, as shown in FIG. 3, only the air that is conditioned in terms of both absolute humidity and relative humidity by passing through the evaporation core 107 and the condenser 207 in the overlapping duct 300 is supplied to a passenger compartment.

The air conditioning apparatus may further include a controller 400 controlling opening and closing of a cooling duct exhaust control door 109, a heating duct exhaust control door 209, and the first overlapping door 301, wherein in a maximum cooling mode, the controller 400 controls the first overlapping door 301 to be opened, controls the heating duct exhaust control door 209 to close the heating duct indoor outlet 203, and controls the cooling duct exhaust control door 109 to close the cooling duct outdoor outlet 105.

As shown in FIG. 4, in a maximum cooling mode, the first overlapping door 301 is opened such that the evaporation core 107 in the overlapping duct 300 is used, and thereby it is possible to cool the air to be supplied to a passenger compartment as soon as possible. Further, the heating duct exhaust control door 209 is controlled to close the heating duct indoor outlet 203 so as to discharge heated air while passing through the heating duct 200 to the outside; and the cooling duct exhaust control door 109 is controlled to close the cooling duct outdoor outlet 105 so as to supply cooled air to a passenger compartment.

The air conditioning apparatus may further include a controller 400 controlling opening and closing of a cooling duct exhaust control door 109, a heating duct exhaust control door 209, and the first overlapping door 301, wherein in a maximum heating mode, the controller 400 controls the first overlapping door 301 to be opened, controls the heating duct exhaust control door 209 to close the heating duct outdoor outlet 205, and controls the cooling duct exhaust control door 109 to close the cooling duct indoor outlet 103.

As shown in FIG. 5, even when the air conditioning apparatus is operated in a maximum heating mode, the area of the evaporation core 107 in the overlapping duct 300 is maximally used by opening the first overlapping door 301. This is because the evaporation core 107 and the condenser 207 are connected to the same refrigerant line, and because when the energy that the evaporation core 107 absorbs through inflow air from the outside is increased, the energy to be supplied to the refrigerant through the compressor connected to the refrigerant line is decreased. Further, the heating duct exhaust control door 209 is controlled to close the heating duct outdoor outlet 205 so as to supply heated air while passing through the heating duct 200 to a passenger compartment; and the cooling duct exhaust control door 109 is controlled to close the cooling duct indoor outlet 103 so as to discharge cooled air outside the vehicle.

Figure 6:
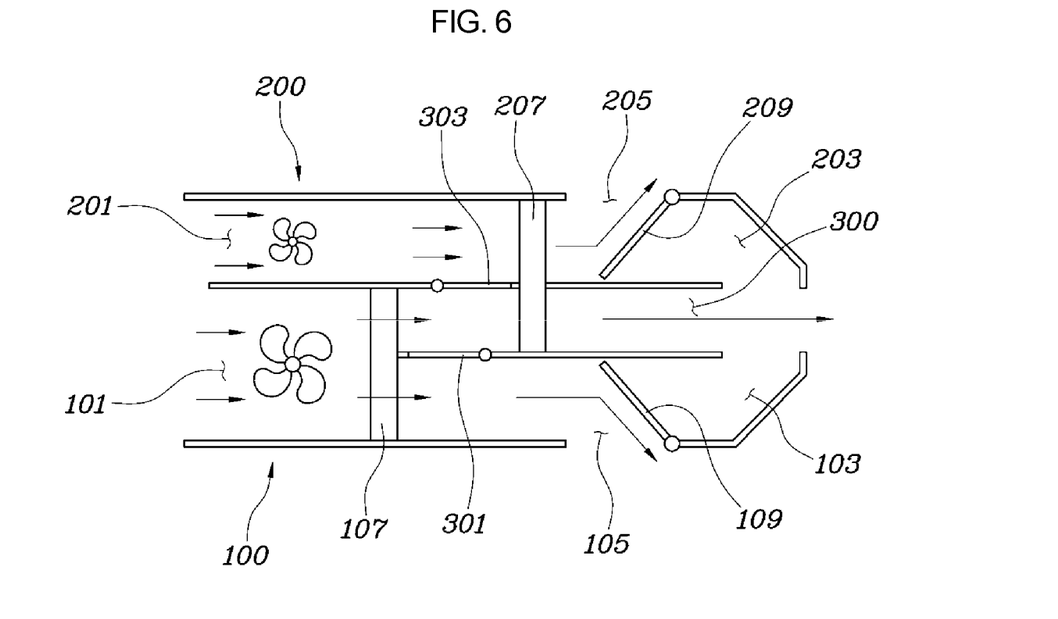
FIG. 6 is an operational view of the air conditioning apparatus for a vehicle according to various embodiments of the present invention in a reheating mode.

The air conditioning apparatus may further include a controller 400 controlling opening and closing of a cooling duct exhaust control door 109, a heating duct exhaust control door 209, the first overlapping door 301, and the second overlapping door 303, wherein in a reheating mode, the controller 400 controls the first overlapping door 301 to be closed, controls the second overlapping door 303 to be closed, controls the heating duct exhaust control door 209 to close the heating duct indoor outlet 203, and controls the cooling duct exhaust control door 109 to close the cooling duct indoor outlet 103.

As shown in FIG. 6, in the reheating mode described above, the first overlapping door 301 and the second overlapping door 303 are controlled to be closed so as to supply the air having passed through the overlapping duct 300 to a passenger compartment.

Figure 7:
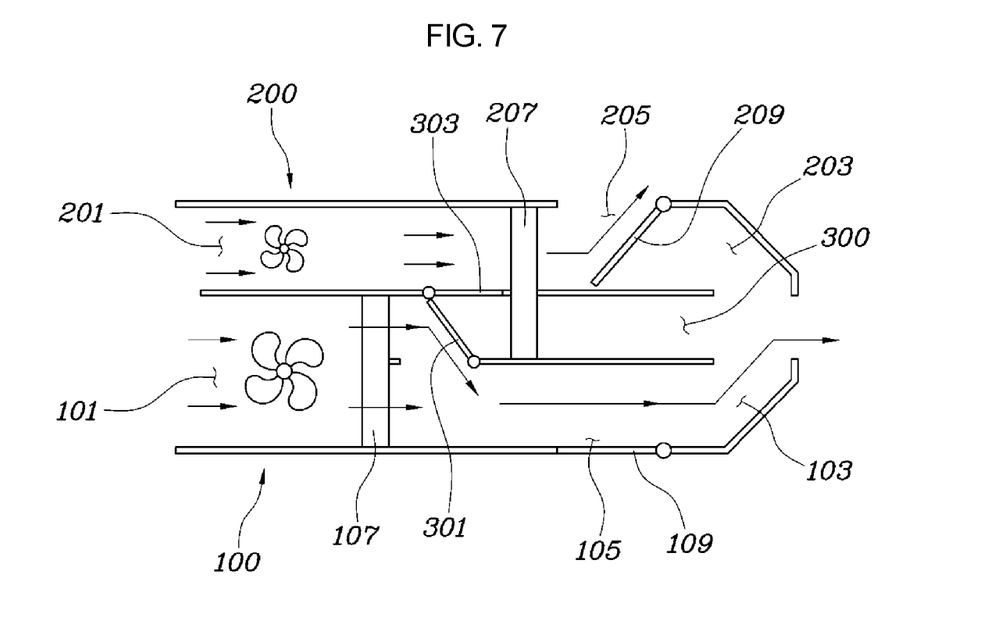
FIG. 7 is an operational view of the air conditioning apparatus for a vehicle according to various embodiments of the present invention in a maximum cooling mode.

The air conditioning apparatus may further include a controller 400 controlling opening and closing of a cooling duct exhaust control door 109, a heating duct exhaust control door 209, the first overlapping door 301, and the second overlapping door 303, wherein in a maximum cooling mode, the controller 400 controls the first overlapping door 301 to be opened, controls the second overlapping door 303 to be closed, controls the heating duct exhaust control door 209 to close the heating duct indoor outlet 203, and controls the cooling duct exhaust control door 109 to close the cooling duct outdoor outlet 105.

As shown in FIG. 7, when the air conditioning apparatus is operated in a maximum cooling mode, the area of the evaporation core 107 in the overlapping duct 300 is maximally used by opening the first overlapping door 301. Further, the air flowing in the overlapping duct 300 through the heating duct 200 may not be discharged to the outside after passing through the condenser 207. Accordingly, the second overlapping door 303 is controlled to be closed such that air does not flow in the overlapping duct 300.

Further, the heating duct exhaust control door 209 is controlled to close the heating duct indoor outlet 203 so as to discharge heated air while passing through the heating duct 200 to the outside, and the cooling duct exhaust control door 109 is controlled to close the cooling duct outdoor outlet 105 so as to supply cooled air to a passenger compartment.

The air conditioning apparatus may further include a controller 400 controlling opening and closing of a cooling duct exhaust control door 109, a heating duct exhaust control door 209, the first overlapping door 301, and the second overlapping door 303, wherein in a maximum heating mode, the controller 400 controls the first overlapping door 301 to be opened, controls the second overlapping door 303 to be opened, controls the heating duct exhaust control door 209 to close the heating duct outdoor outlet 205, and controls the cooling duct exhaust control door 109 to close the cooling duct indoor outlet 103.

As shown in FIG. 8, when the air conditioning apparatus is operated in a maximum heating mode, the area of the condenser 207 in the overlapping duct 300 is maximally used by opening the second overlapping door 303, and thereby it is possible to quickly heat air to be supplied to a passenger compartment. Further, the heating duct exhaust control door 209 is controlled to close the heating duct outdoor outlet 205 so as to supply heated air while passing through the heating duct 200 to a passenger compartment; and the cooling duct exhaust control door 109 is controlled to close the cooling duct indoor outlet 103 so as to discharge cooled air outside a vehicle.

Further, the first overlapping door 301 is also controlled to be closed. This is because the evaporation core 107 and the condenser 207 are connected to the same refrigerant line, and because when the energy that the evaporation core 107 absorbs through inflow air from the outside is increased, the energy to be supplied to the refrigerant through the compressor connected to the refrigerant line is decreased.

The air conditioning apparatus may further include a controller 400 controlling opening and closing of a cooling duct exhaust control door 109, a heating duct exhaust control door 209, the first overlapping door 301, and the second overlapping door 303, wherein in a temperature control mode, the controller 400 controls the first overlapping door 301 to be opened, and controls the second overlapping door 303 to be opened.

As shown in FIG. 9, by controlling the first overlapping door 301 and the second overlapping door 303, the entire area of both the evaporation core 107 and the condenser 207 is used in the temperature control mode, and accordingly it is possible to improve operation efficiency of the air conditioning apparatus.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioning apparatus for a vehicle, the air conditioning apparatus comprising:
 a cooling duct provided with a cooling duct inlet at a first end of the cooling duct, and a cooling duct indoor outlet and a cooling duct outdoor outlet at a second end of the cooling duct, and including an evaporation core disposed in the cooling duct;
 a heating duct provided with a heating duct inlet at a first end of the heating duct, and a heating duct indoor outlet and a heating duct outdoor outlet at a second end of the heating duct, and including a condenser disposed in the heating duct;
 an overlapping duct provided by overlapping the cooling duct with the heating duct, wherein the evaporation core and the condenser are disposed respectively at an upstream and a downstream of an air flow, and wherein the evaporation core and the condenser are connected with each other on one refrigerant passage;
 a first overlapping door provided on a partition wall between the cooling duct and the overlapping duct, and disposed between the evaporation core and the condenser such that the overlapping duct communicates with the cooling duct; and
 a second overlapping door provided on a partition wall between the heating duct and the overlapping duct, and disposed between the evaporation core and the condenser such that the overlapping duct communicates with the heating duct,
 wherein when the first overlapping door and the second overlapping door are opened simultaneously, the first overlapping door is overlapped with the second overlapping door.

2. The air conditioning apparatus of claim 1, further comprising:
 a cooling duct exhaust control door provided between the indoor outlet and the outdoor outlet of the cooling duct, and controlling an outflow amount of air; and
 a heating duct exhaust control door provided between the indoor outlet and the outdoor outlet of the heating duct, and controlling an outflow amount of air.

3. The air conditioning apparatus of claim 1, further comprising a controller controlling opening and closing of a cooling duct exhaust control door, a heating duct exhaust control door, and the first overlapping door,
 wherein in a reheating mode, the controller controls the first overlapping door to be closed, controls the heating duct exhaust control door to close the heating duct indoor outlet, and controls the cooling duct exhaust control door to close the cooling duct indoor outlet.

4. The air conditioning apparatus of claim 1, further comprising a controller controlling opening and closing of a cooling duct exhaust control door, a heating duct exhaust control door, and the first overlapping door,
 wherein in a maximum cooling mode, the controller controls the first overlapping door to be opened, controls the heating duct exhaust control door to close the heating duct indoor outlet, and controls the cooling duct exhaust control door to close the cooling duct outdoor outlet.

5. The air conditioning apparatus of claim 1, further comprising a controller controlling opening and closing of a cooling duct exhaust control door, a heating duct exhaust control door, and the first overlapping door,
 wherein in a maximum heating mode, the controller controls the first overlapping door to be opened, controls the heating duct exhaust control door to close the heating duct outdoor outlet, and controls the cooling duct exhaust control door to close the cooling duct indoor outlet.

6. The air conditioning apparatus of claim 1, further comprising a controller controlling opening and closing of a cooling duct exhaust control door, a heating duct exhaust control door, the first overlapping door, and the second overlapping door,
 wherein in a reheating mode, the controller controls the first overlapping door to be closed, controls the second overlapping door to be closed, controls the heating duct exhaust control door to close the heating duct indoor outlet, and controls the cooling duct exhaust control door to close the cooling duct indoor outlet.

7. The air conditioning apparatus of claim 1, further comprising a controller controlling opening and closing of a cooling duct exhaust control door, a heating duct exhaust control door, the first overlapping door, and the second overlapping door,
 wherein in a maximum cooling mode, the controller controls the first overlapping door to be opened, controls the second overlapping door to be closed, controls the heating duct exhaust control door to close the heating duct indoor outlet, and controls the cooling duct exhaust control door to close the cooling duct outdoor outlet.

8. The air conditioning apparatus of claim 1, further comprising a controller controlling opening and closing of a cooling duct exhaust control door, a heating duct exhaust control door, the first overlapping door, and the second overlapping door,
   wherein in a maximum heating mode, the controller controls the first overlapping door to be opened, controls the second overlapping door to be opened, controls the heating duct exhaust control door to close the heating duct outdoor outlet, and controls the cooling duct exhaust control door to close the cooling duct indoor outlet.

9. The air conditioning apparatus of claim 1, further comprising a controller controlling opening and closing of the first overlapping door and the second overlapping door, wherein in a temperature control mode, the controller controls the first overlapping door to be opened, and controls the second overlapping door to be opened.

* * * * *